H. DICKE.
GAS PURIFYING APPARATUS.
APPLICATION FILED DEC. 6, 1913.
1,129,558.
Patented Feb. 23, 1915.
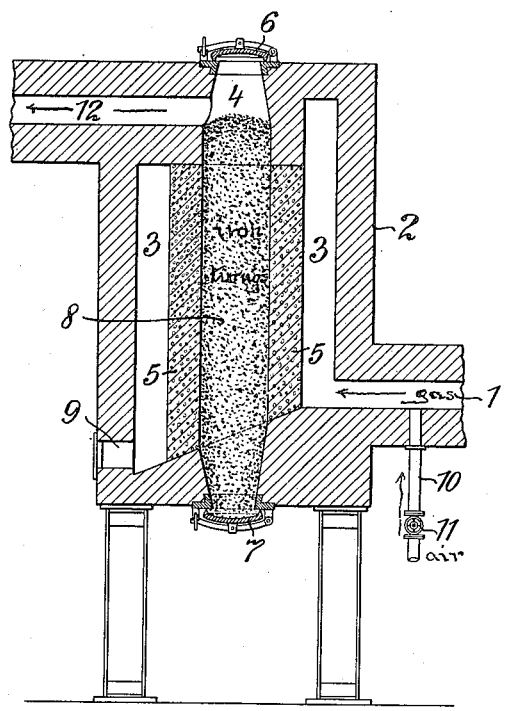
Witnesses:
Johannes Fritze
Charles Mathé
Inventor
Hugo Dicke
by John Lotka
Attorney

UNITED STATES PATENT OFFICE.

HUGO DICKE, OF BERLIN-WILMERSDORF, GERMANY, ASSIGNOR TO BERLIN-ANHALTISCHE MASCHINENBAU-AKTIEN-GESELLSCHAFT, OF BERLIN, GERMANY, A CORPORATION OF GERMANY.

GAS-PURIFYING APPARATUS.

1,129,558.  Specification of Letters Patent.  Patented Feb. 23, 1915.

Application filed December 6, 1913. Serial No. 804,998.

*To all whom it may concern:*

Be it known that I, HUGO DICKE, a subject of the German Emperor, and a resident of Berlin-Wilmersdorf, Germany, have invented certain new and useful Improvements in Gas-Purifying Apparatus, of which the following is a specification.

This invention relates to improvements in purifying apparatus for generator gas, water gas and the like.

In the manufacture of hydrogen gas by alternate reduction of iron ores by means of reducing gases, and oxidation by means of steam, on a large scale, it has been found that it is a very great drawback that when the reducing gases which are generally constituted by generator gas or water gas—act on the iron ores immediately after their generation, so as to utilize their heat, the sulfur compounds which constitute impurities in the said gases and the soot, carried away by the latter, render the iron ores to be reduced, so impure that within a short time the efficiency of the ores is considerably affected and it becomes necessary frequently to renew them. Apart from the high consumption of iron ores, every time the reducing vessels are recharged an interruption in the working is involved. These drawbacks are obviated by the use of the purifier according to this invention, which in a simple, thorough and economical manner, removes from the reducing gases, while they are still hot, all the impurities they contain, such as ashes and gaseous sulfur compounds. To that end, hot reduction gases coming from the generator, are caused to pass within the purifier first through a porous wall, and then through iron turnings or other pieces of metal sitable for absorbing sulfur. The porous wall keeps back the soot carried away by the gases, while the iron turnings heated by the hot reduction gases absorb sulfur compounds. As the efficiency of iron turnings would also be affected by soot, if it came into contact therewith, the purifier is constructed so that the soot is removed from the current of gas before the latter comes into contact with the hot iron turnings. This is effected in a simple manner in the new purifier by providing for the iron turnings a retort-like vessel, the lateral walls of which are made of porous material. Further, the gases flowing into the purifier, first enter a hollow cylinder surrounding the retort, and after filling this cylinder, pass through the porous wall of the retort and then through the iron turnings.

The casing or jacket constituting part of the hollow cylinder, is further made in such a manner as to avoid as much as possible the hot gases from the generator giving up any of their heat. As however the heat of the reduction gases is sometimes insufficient for heating the iron turnings to that temperature at which they can absorb sulfur compounds, an air supply pipe, which can be shut off to throttle the current of air from a blower opens into the purifier inlet. On the air entering the purifier, the hot generator gas is ignited, and heats the iron turnings to a high temperature.

The vessel for receiving the iron turnings, is further provided with a top and bottom cover, so that the purifier can be filled with iron turnings or emptied within a short time.

For the purpose of explaining the invention an example embodying the same has been shown in the accompanying drawing, in which my improved apparatus is shown in vertical longitudinal section.

In the example shown in the drawing, my improved apparatus consists of an outer casing 2 inclosing an inner casing or vessel 4 in the form of a retort the wall 5 of which is made of a suitable porous material, and which communicates through an outlet 12 with the place of use, such as a reducing vessel. Between the outer and inner casings a chamber 3 is provided which has an inlet 1 connected with a generator for reducing gas or the like. The vessel 4 is closed in an air tight manner at either end by closing devices 6 and 7; iron turnings are introduced at the top of the vessel 4, and after being saturated with sulfur compounds are discharged at the bottom. The gas filling the hollow cylinder 3, is forced to pass through the porous wall 5 of the vessel 4 which holds back the soot carried from the generator, so that the soot collects at the bottom of the hollow cylinder 3, whence it is removed from time to time through a cleaning opening 9 closed in a gas tight manner. Within the vessel 4, the reducing gas comes into thorough contact with the hot iron turnings 8, and gives off to the latter its sulfur compounds. In order to raise the purifier 2 to the required temperature quickly when starting and also to maintain its temperature during working at the high level required for the absorption of sulfur by the iron shavings 8, the hollow cylinder 3 is further provided with an air pipe 10 coming from a blower and opening near the mouth of the conduit 1. The supply of combustion air to the purifier 3 can be regulated by means of a valve or cock 11. From the vessel 4, the gas passes in a purified state into the conduit 12, and from the latter into the reducing vessel which is preferably arranged immediately behind it.

I claim:

1. A purifier for separating soot, dust, and sulfur compounds from generator gas, water gas, and the like, comprising a vessel having an outlet and a wall of porous material, and adapted to receive a material suitable for absorbing sulfur compounds, a chamber arranged concentrically with said vessel and communicating with a supply of hot gases to be purified, and means for conveying a supply of air for supporting combustion to said chamber.

2. A purifier for separating soot, dust, and sulfur compounds from generator gas, water gas, and the like, comprising a vessel having an outlet and a wall of porous material, and adapted to receive a material suitable for absorbing sulfur compounds, a chamber arranged concentrically with said vessel and communicating with a supply of hot gases to be purified, means for conveying a supply of air for supporting combustion to said chamber, and means to regulate said supply of air.

In testimony whereof, I have signed this specification in the presence of two subscribing witnesses.

HUGO DICKE.

Witnesses:
WOLDEMAR HAUPT,
HENRY HASPER.